April 25, 1939. C. H. HELLYAR 2,155,657
THRUST BEARING
Filed March 20, 1937
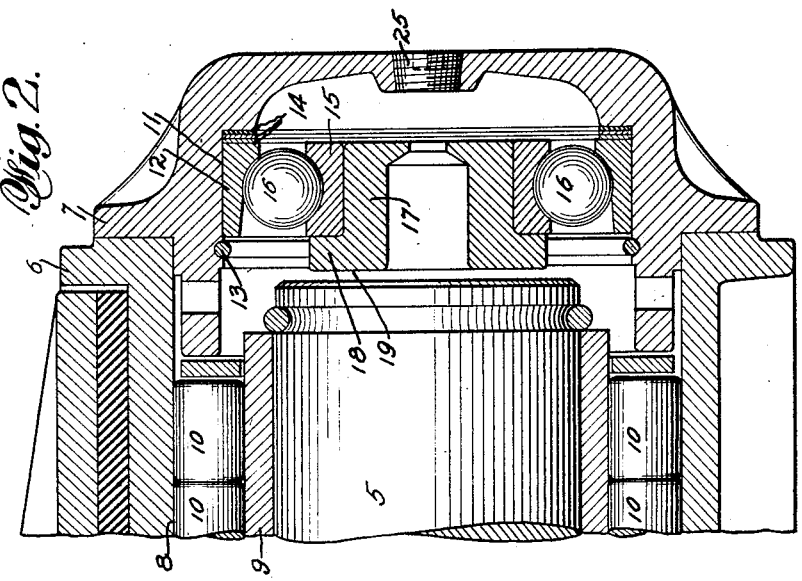
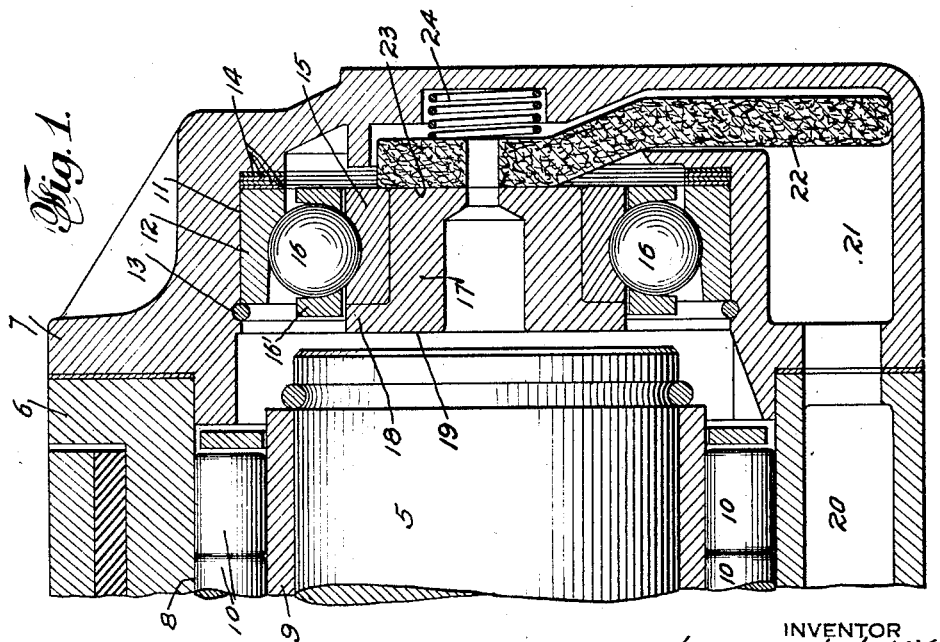
INVENTOR
CHARLES H. HELLYAR
BY
Mitchell Bechtel
ATTORNEYS.

Patented Apr. 25, 1939

2,155,657

UNITED STATES PATENT OFFICE 2,155,657

THRUST BEARING

Charles Henry Hellyar, New Britain, Conn., assignor to The Fafnir Bearing Company, New Britain, Conn., a corporation of Connecticut Application March 20, 1937, Serial No. 131,990

5 Claims. (Cl. 308—233)

My invention relates in general to a journal or shaft bearing and more particularly to a thrust bearing for taking thrust loads of an axially movable rotatable shaft.

It is the principal object of the invention to provide an improved form of thrust bearing which is simple in construction, relatively cheap to manufacture and effective in absorbing thrust loads with a minimum of friction.

In general the object is to provide an improved form of thrust bearing for an axially movable shaft, such as a railway car journal or similar shaft or axle.

In the drawing which shows, for illustrative purposes only, preferred forms of the invention—

Fig. 1 is a fragmentary view of a railway journal and associated parts and illustrating my improved thrust bearing; and Fig. 2 is a view similar to Fig. 1 but illustrating a slightly modified form arranged for grease lubrication.

Except for the method of lubrication the principal parts of the two forms are the same and like reference characters are applied to both.

In said drawing 5 indicates a railway journal or other shaft, which is rotatably mounted in a housing, in this case comprising a journal box 6, having a cover 7 secured thereto and in any suitable manner, as by means of stud bolts (not shown). The interior of the journal box 6 is provided with a raceway surface 8 and the journal carries a raceway sleeve 9. Anti-friction bearing members, such as cylindrical rollers 10, anti-frictionally and rotatably support the journal 5 in the box.

During normal operation the journal 5 may move back and forth axially in the housing and I have provided an improved thrust bearing for limiting the axial movement and taking the end thrusts of the journal incident to its normal operation. My improved thrust bearing preferably includes a standard angular contact unit handling ball bearing. In the form illustrated the cover or cap 7 has a counterbore 11 therein concentric with the journal 5 and the outer bearing ring 12 fits within the counterbore and may be held therein by means of a snap ring 13, as will be understood. Between the bottom of the counterbore and the adjacent edge of the outer ring 12 there may be a plurality of shims or washers 14, one or more of which are preferably of slightly resilient material, so as to give somewhat under stress and thus tend to cushion the blows of the journal in its axial movement and permit a better functioning of the thrust bearing. The outer ring 12 preferably does not fit tightly in the counterbore but is mounted sufficiently loosely therein so that it can rock or self-aline slightly under stress, so that the balls or other anti-friction devices forming part of my thrust bearing will not be unduly pinched or stressed at one side in case there are irregularities in machining the end of the journal or other parts. The anti-friction bearing forming a part of the thrust bearing, as stated, preferably comprises a standard angular contact bearing, which includes the outer angular contact ring 12, an inner bearing ring 15 with interposed anti-friction bearing members, preferably balls 16. The bearing is designed to take great thrusts in one direction and the bearing is preferably of the unit handling type, that is, the balls hold the two bearing rings in position relatively to each other and therefore the races of the two rings are such that very slight thrust may be taken in the opposite direction, that is, the races are sufficiently deep so that the bearing will not fall apart. In the form shown in Fig. 1 the balls are held in a suitable spacer or ball separator 16', while in the form shown in Fig. 2 the bearing may be filled with balls and no separator employed.

Instead of having the end of the journal 5 abut directly the edge of the inner ring I provide a thrust block 17, preferably formed of bronze or other bearing metal dissimilar in character to the metal of the journal 5. The thrust block 17 in the form illustrated is bodily carried by the inner ring 15 and comprises a plug within the bore of the inner ring 15 and preferably extending completely therethrough so as to be substantially flush with the right hand edge of the inner ring. The left hand end of the plug is flanged out circumferentially, as indicated at 18, and has a very substantial left hand bearing face 19, to be engaged by the end of the journal 5. The opposite end of the flange 18 abuts the left hand edge of the inner ring, so the thrust block is bodily carried by the inner ring, and when the axle abuts the thrust face 19 such thrusts are transmitted to the inner ring, the balls 16 and the outer ring 12 to the cover cap 7.

In the form illustrated the thrust bearing will rotate only when the axle moves toward the right, so as to engage the thrust face 19. However, if necessary or desired a driving connection may be provided between the thrust block and the journal 5, so as to maintain the thrust bearing in rotation at all times. It has been found, though, that in many cases the thrust bearing is in no wise damaged by having the same put in rotation almost instantaneously by the journal 5 when the latter engages the thrust block 17 and this is more particularly so when the outer ring is to some extent resiliently supported, as by means of the shims or washers 14 permitting some give during the short interval of time required to bring the bearing up to the rotative speed of the journal 5.

In the form shown in Fig. 1 all bearing parts are designed to be oil lubricated and the bearing box 6 is cored out at 20, to provide an oil passage, and the cover cap has an oil reservoir 21 therein. A wick 22 dips into the oil in the reservoir and engages the right hand face 23 of the thrust block 17. The wick may be urged into engagement with the thrust block by means of a light spring 24. When the thrust block rotates, that is, when the journal 5 moves axially into engagement with the thrust block, oil taken from the wick 22 is thrown off centrifugally by the face 23 of the thrust block and such small quantity of oil runs down and through the thrust bearing, so as to lubricate the same. The oil, after passing the roller bearings 10, returns to the well or reservoir 21 through the cored passage 20.

In the form shown in Fig. 2 all bearing parts may be and preferably are substantially the same as shown in Fig. 1 but the bearing of Fig. 2 is designed to be grease lubricated, that is to say, the housing may be loaded with grease and a filler plug 25 is provided in the cover cap 7. The bearing shown in Fig. 2 requires no cored passage, such as 20, nor any oil reservoir 21; nor additional space for the wick, etc., and therefore the cover cap may be made much smaller and also the box 6 may be made smaller and thus take up less space.

It will be seen that my improved thrust bearing is exceedingly simple in design and construction and that the angular contact bearing, while maintaining itself and the thrust block 17 in operative position, will take all of the thrust loads transmitted by the journal 5. The thrust bearing itself is preferably of a standard, angular contact type, which may be readily replaced. There is little to get out of order and, as stated, should the thrust bearing fail a new one may be purchased from any bearing dealer.

While the invention has been described in considerable detail and illustrative forms shown, it is to be understood that various changes and modifications may be made within the scope of the invention as defined in the appended claims.

I claim:

1. In a device of the character indicated, a housing, an axially movable shaft rotatably mounted therein, thrust means for the end of said shaft and including a radial type angular contact unit handling ball bearing having inner and outer bearing rings with interposed anti-friction bearing members serving to hold said rings in unit handling relationship, one of said bearing rings being supported by said housing, and a thrust block bodily carried by the other of said bearing rings and having a thrust flange extending over and engaging the edge of its ring and positioned to be intermittently engaged by the end of said shaft, for the purpose described.

2. In a device of the character indicated, a housing, an axially movable shaft rotatably mounted therein, thrust means for the end of said shaft and including inner and outer bearing rings with interposed anti-friction bearing members, one of said rings being mounted in said housing, a thrust block bodily carried by the other of said rings and positioned to be engaged at one end by the end of said shaft, and means engaging the opposite end of said thrust block for lubricating parts within said housing.

3. In a device of the character indicated, a housing, an axially movable shaft rotatably mounted therein, thrust means for said shaft including inner and outer bearing rings with anti-friction bearing members interposed between said rings, one of said rings being mounted in said housing, a thrust block bodily carried by the other of said rings and extending axially from one side thereof to the other, said thrust block having a face for engagement with the end of said shaft, and wick means engaging the opposite side of said thrust block and dipping into an oil reservoir, for the purpose described.

4. In a device of the character indicated, a housing, an axially movable shaft rotatably mounted therein, thrust means for the end of said shaft including an angular contact unit handling ball bearing, said bearing comprising an outer bearing ring mounted in said housing, an inner bearing ring, balls interposed between raceways in said rings, and a thrust block secured in the bore of said inner ring and having an outwardly extending flange engaging the edge of said ring adjacent the end of said shaft, the face of said flange adjacent the end of said shaft constituting a thrust face to be engaged by the end of said shaft, for the purpose described.

5. In a device of the character indicated, a housing, an axially movable shaft rotatably mounted in said housing, thrust means for said shaft including a radial type ball bearing held in unit handling relationship by the balls, the outer ring of said bearing being mounted in said housing, a bronze thrust block firmly mounted in the bore of said inner ring and projecting beyond said bore adjacent the end of said shaft and providing a thrust surface for intermittent engagement by said shaft.

CHARLES HENRY HELLYAR.